(12) United States Patent
Lin et al.

(10) Patent No.: US 6,304,358 B1
(45) Date of Patent: Oct. 16, 2001

(54) REFLECTIVE/TRANSMISSIVE SCANNER WITH SYNCHRONOUSLY MOVING IMAGE SENSOR AND LIGHT SOURCE

(75) Inventors: Chih-hung Lin, Taipei; Yi-Yi Ho, Taichung, both of (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/536,220

(22) Filed: Mar. 27, 2000

(30) Foreign Application Priority Data

Apr. 14, 1999 (TW) .................................................. 88205724

(51) Int. Cl.[7] .................................................... G02B 26/08
(52) U.S. Cl. ............................ 359/196; 358/487; 358/497
(58) Field of Search ..................................... 359/196, 197, 359/198, 201; 350/234–235; 358/474, 475, 487, 494, 497; 399/211, 212

(56) References Cited

U.S. PATENT DOCUMENTS 5,966,221 * 10/1999 Tellam et al. .......................... 358/475
6,233,065 * 5/2001 Lee ........................................ 358/475

* cited by examiner

Primary Examiner—James Phan
(74) Attorney, Agent, or Firm—Ladas & Parry (57) ABSTRACT

A reflective/transmissive scanner having a transmissive mode light source that is synchronously moved with the image-retrieving device. The scanner is provided with a scanner body having an upper surface with slots formed therethrough and a first transparent plate disposed in an aperture in the upper surface of the scanner body on which an object to be scanned is placed. A second transparent plate is provided in the lower surface of the scanner lid, corresponding slots being formed in the second transparent plate. A first support frame is disposed within the scanner body, with a reflective light source and an image retrieving device disposed thereupon, and a second support frame is disposed within the scanner lid, with a transmissive mode light source disposed thereupon. When the scanner lid is in a closed position, the first support frame and the second support frame are physically engaged through the slots, allowing the alignment between the transmissive mode light source and the image-retrieving device to be synchronously maintained.

13 Claims, 8 Drawing Sheets

REFLECTIVE/TRANSMISSIVE SCANNER WITH SYNCHRONOUSLY MOVING IMAGE SENSOR AND LIGHT SOURCE

BACKGROUND OF THE INVENTION

1. Field of the Invention

The present invention relates to an optical scanner for retrieving digital images of opaque and transmissive objects. In particular, this invention relates to a scanner in which the alignment of a transmissive mode light source and an image-retrieving device can be synchronously maintained.

2. Description of the Related Art

Recent developments in the use of high speed, low cost digital electronic imaging systems to process, transmit and display digital information have substantially increased the demand for optical scanners to convert information into digital electronic form. A variety of optical scanners, including facsimile machines and digital copiers, have been developed to meet this growing demand. The optical scanners generally fall within two categories: reflective scanners for scanning opaque objects, such as documents and photographs; and transmissive scanners for scanning transparent objects, such as slides and transparencies. Reflective scanners project light onto the side of the object to be scanned. The object illuminated by the reflected light is then viewed by a digital image-retrieving device that converts the image into a digital electronic form. Transmissive scanners project light through the object to be scanned. The transmissive object is also viewed by a digital image-retrieving device to then be stored in a digital electronic form. The growing demand for both reflective and transmissive scanners has resulted in a need for scanners to provide both capabilities.

Figure 2:
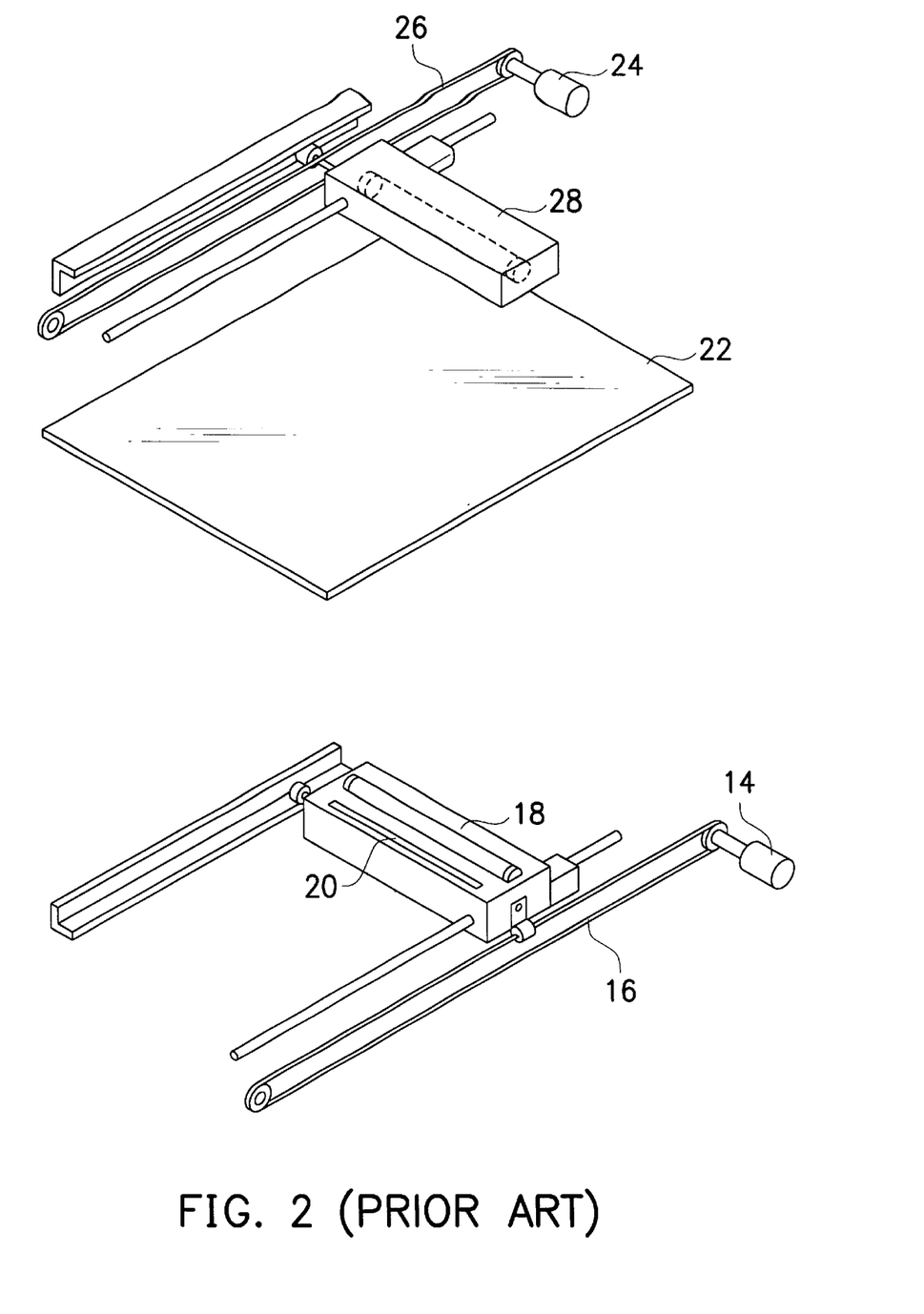
FIG. 2 is an exploded view of the structure of a conventional scanner.

AA conventional dual mode scanner is illustrated in FIG. 2. This type of scanner includes a digital image-retrieving device 20 and a reflective mode light source 18 mounted on rails and driven by a motor 14 and belt 16 within the scanner body to scan along the length of the document. The reflective mode light source 18 projects light upon the portion of the object within the field of view of the image-retrieving device. Documents and photographs are placed on a transparent plate 22. The reflective mode light source 18 and image-retrieving device 20 move incrementally lengthwise across a document placed on the transparent plate 22 to scan an image line by line.

This conventional dual mode scanner has a second light source 28 for scanning transmissive objects. This transmissive mode light source 28 is preferably housed behind a second transparent plate (not shown) within a scanner lid that overlies the scanner body. The transmissive mode light source 28 is movably mounted on a pair of rails and wired electronically to the scanner body to provide light through a portion of a transmissive object within the field of view of the image-retrieving device. The transmissive mode light source mechanism includes a second motor 24 and belt 26 to maintain the light directly within the image-retrieving device's field of view by incrementally moving along the rails in the scanner lid in synchronous movement with the image-retrieving device 20.

Figure 1A:
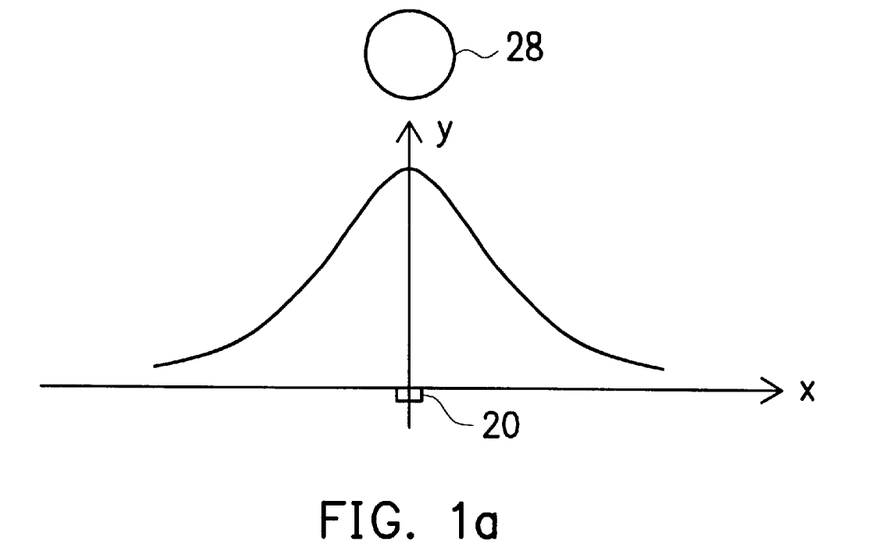
FIGS. 1a and 1b illustrate the light intensity distribution of a light source on a flat surface.
Figure 1B:
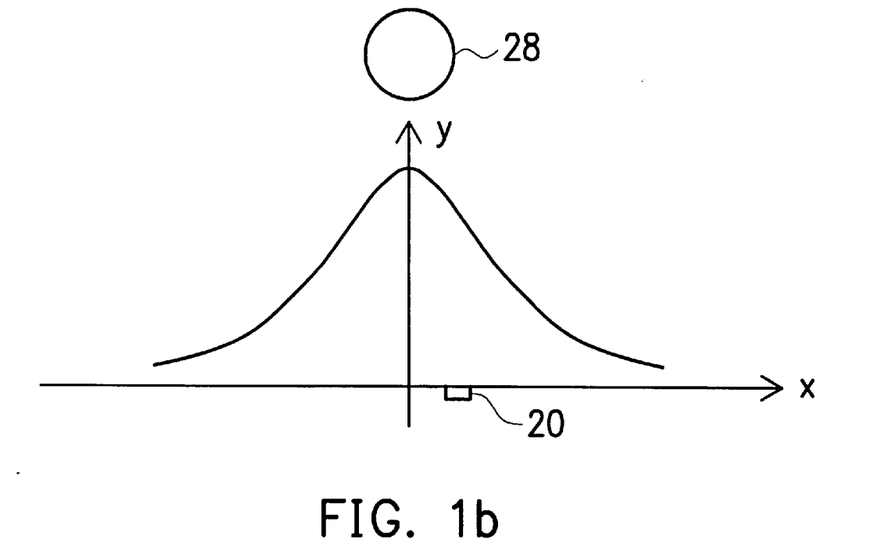

In order to obtain the best picture quality, the transmissive mode light source 28 located in the scanner lid must be maintained in synchronous alignment with the image-retrieving device 20 located in the scanner body at all times during scanning. Referring to FIGS. 1a and 1b, if transmissive mode light source 28 does not move synchronously with the image-retrieving device 20, the relative positions of the transmissive mode light source 28 and the image-retrieving device 20 will not be maintained. Thus, the light intensity detected by image-retrieving device 20 will change, leading to a deterioration of the scanning quality.

The conventional dual mode (transmissive mode/reflective mode) scanner relies on the operation of two motors 14, 24 and two belts 16, 26. Therefore, in addition to the extra cost of the second motor and belt, any aberration in the functioning of either motor or a slippage of either belt could lead to non-synchronous movement of the transmissive mode light source 28 and image-retrieving device 20. Furthermore, such a scanner typically requires electronic circuitry in both the scanner body and the scanner lid to maintain the alignment between the transmissive mode light source 28 and the image-retrieving device 20. This further increases the cost of manufacturing the scanner.

SUMMARY OF THE INVENTION

Accordingly, to overcome the drawbacks of the conventional scanner, the object of the present invention is to provide an optical scanner capable of scanning both opaque and transmissive objects in which the alignment of the transmissive mode light source and the image-retrieving device can be synchronously maintained.

To attain the above object, the present invention provides a physical engagement between the transmissive mode light source and the image-retrieving device; thereby, only one driving device is needed to move the transmissive mode light source, the reflective mode light source, and the image-retrieving device. More particularly, the present invention provides an optical scanner for retrieving digital images of both opaque and transmissive objects, comprising: a lower housing defining a longitudinal axis and having a slot formed there through; a first transparent plate disposed in the upper surface of the lower housing on which an object to be scanned is placed; an upper housing pivotally disposed on the lower housing so that the upper housing can be pivoted between an open and a closed position; a second transparent plate disposed in the lower surface of the upper housing, a second slot being formed through the second transparent plate, wherein the first slot and the second slot correspond in position; a first support frame disposed within the lower housing to be movable along the longitudinal axis; a first light source disposed on the first support frame for providing light to scan an opaque object; an image-retrieving device disposed on the first support frame; a second support frame disposed within the upper housing to be movable along the longitudinal axis; a second light source disposed on the second support frame for providing light to scan a transmissive object; means for engaging the first support frame to the second support frame through the first and second slots when the upper housing is in a closed position; and a driving device for synchronously moving the first support frame and the second support frame along the longitudinal axis.

By providing a physical engagement between the transmissive mode light source and the image-retrieving device, the alignment of the transmissive mode light source and the imaging-sensing device can be assured. Therefore, deterioration of the scanning quality due to misalignment of the transmissive mode light source and the image-retrieving device can be avoided. Since only a single driving device is needed to move the transmissive mode light source, the reflective mode light source, and the image-retrieving device, errors caused by any aberrations in the functioning of driving device can be limited. Furthermore, the extra cost of a second driving device and electronic circuitry necessary to synchronize two driving devices can be saved.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 3A:
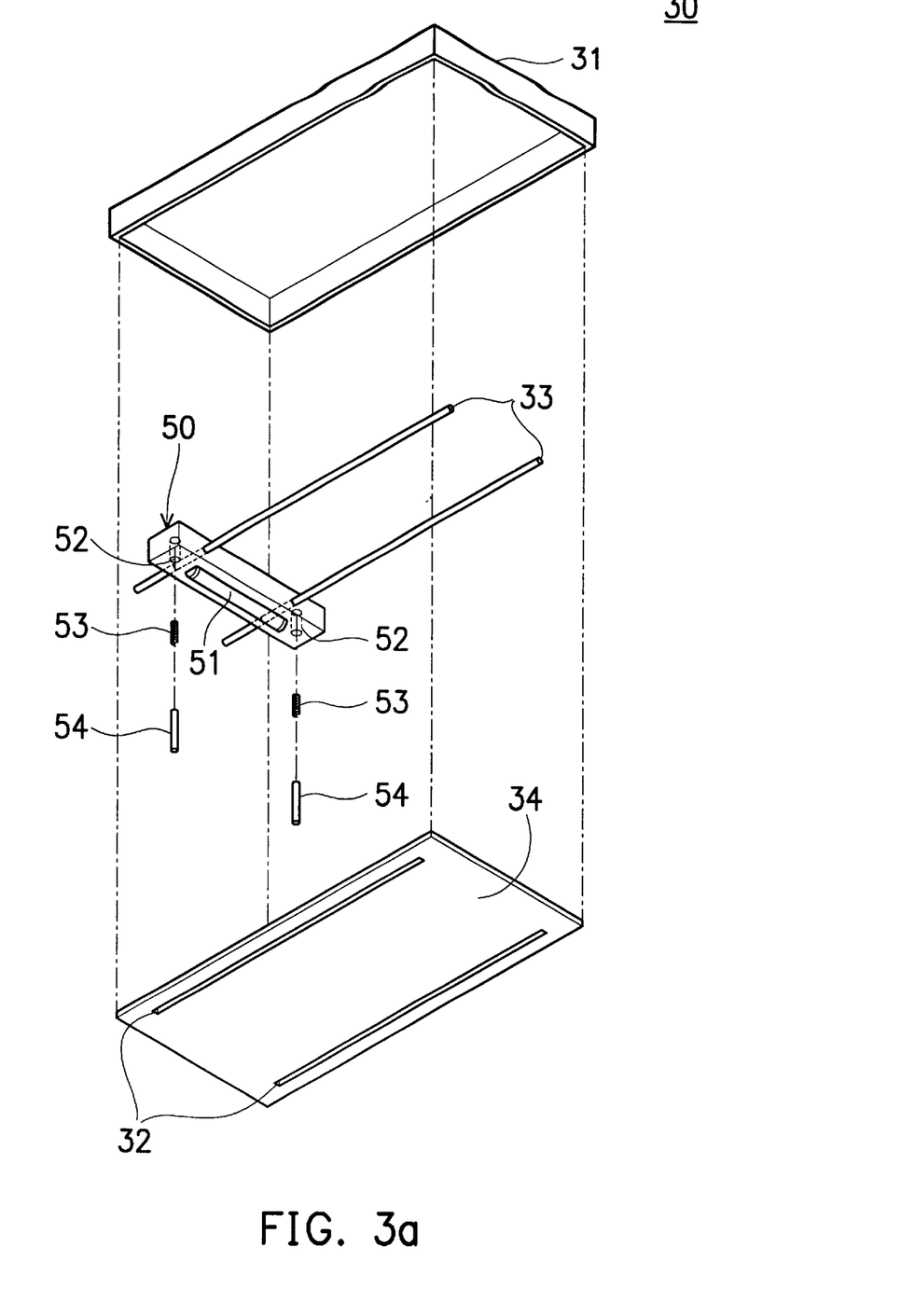
FIGS. 3a and 3b are exploded views of the scanner according to one embodiment of the present invention.
Figure 3B:
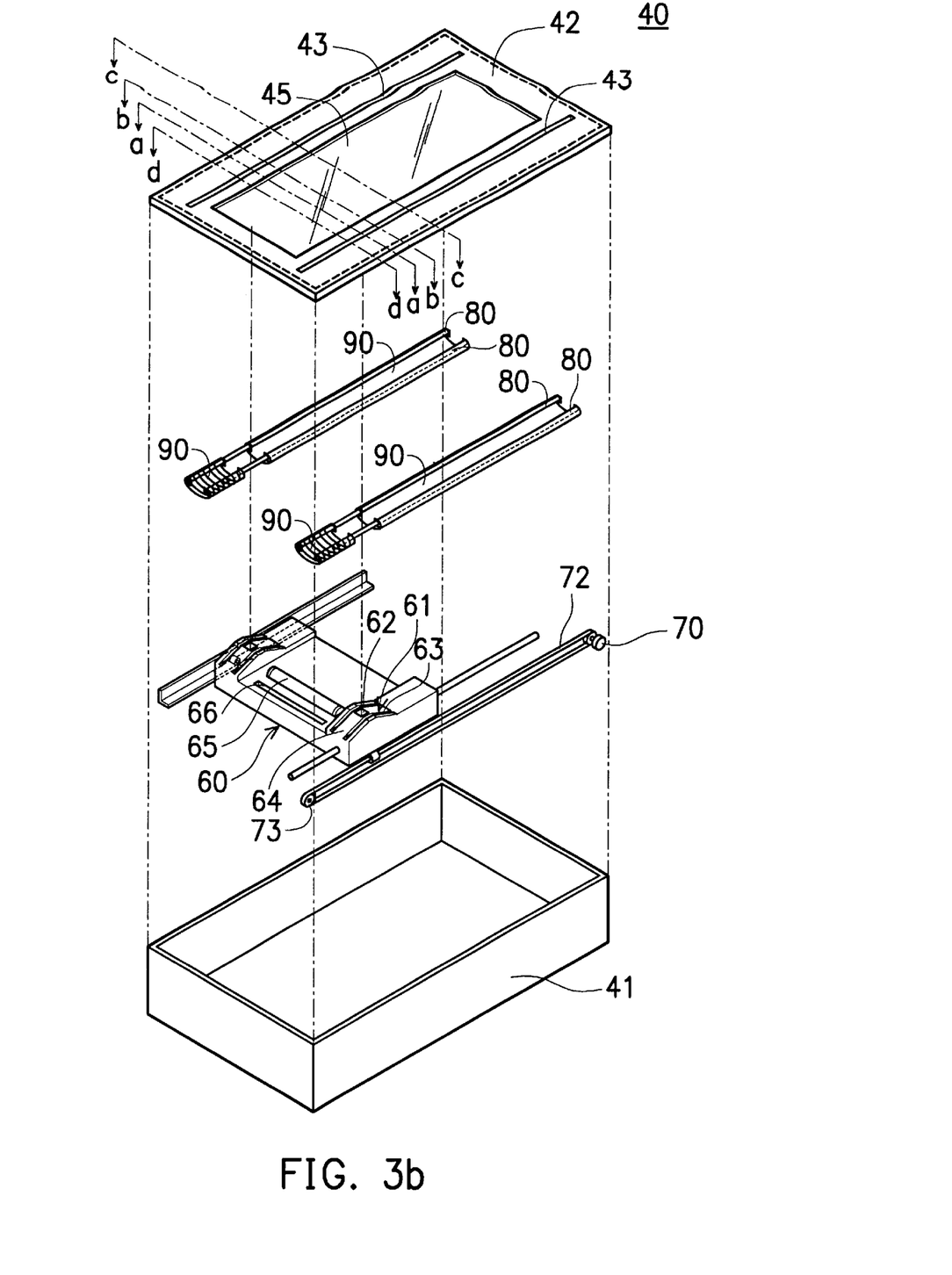

Please refer to FIGS. 3a and 3b. According to one embodiment of the present invention, an optical scanner for retrieving images of opaque and transmissive objects includes a scanner lid 30 pivotally disposed on a scanner body 40.

As shown in FIG. 3b, the scanner body 40 includes a lower housing 41 defining a longitudinal axis and a first transparent plate 45 disposed in an aperture in the upper surface 42 of the lower housing 41. Two slots 43 are formed in the upper surface 42. A first support frame 60 is disposed in the lower housing 41 such that it can be moved along the longitudinal axis by driving device 70, belt 72, and wheel 73. Driving device 70 can be, for example, a step motor. On the first support frame 60 are disposed image-retrieving device 66 and a first light source 65. The image-retrieving device 66 can be, for example, a CCD (charge-coupled device) module, a CIS (contact image sensor) module or other image sensing device. When scanning an opaque object placed on the first transparent plate 45, light from the first light source 65 is reflected off the surface of the opaque object and retrieved by the image-retrieving device 66. The first support frame 60 is moved incrementally along the longitudinal axis by the driving device 70 so that the entire opaque object can be scanned.

Referring to FIG. 3a, the scanner lid 30 includes an upper housing 31 and a second transparent plate 34. Two slots 32 are formed in the second transparent plate 34 in positions corresponding to the slots 43 in the first upper surface 42. A second support frame 50 movable along the longitudinal axis on rails 33 is disposed in upper housing 31. A transmissive mode light source 51 is disposed on the second support frame 50.

Figure 5A:
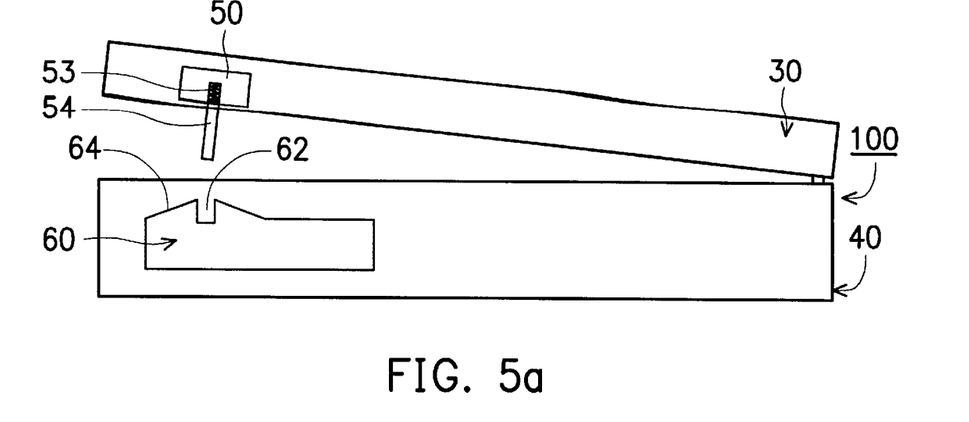
FIGS. 5a–5c are side views of the scanner according to one embodiment of the present invention illustrating the engagement of the first support frame to the second support frame.
Figure 5B:
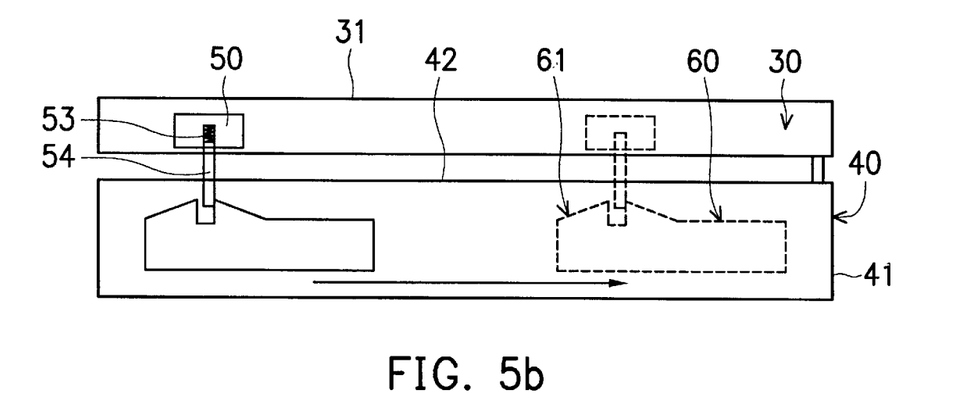

An apparatus for physically engaging the second support frame 50 to the first support frame 60 through slots 43 and slots 32 according to one embodiment of the present invention is now described. Two holes 52 are formed in the second support frame 50 in positions corresponding to slots 32. Springs 53 and rods 54 are disposed in the holes 53. Springs 53 provide a resilient pressure on rods 54. Rods 54 extend downward through slots 32. Two holes 62 are formed in first support frame 60 in positions corresponding to slots 43. Referring to FIGS. 5a and 5b, when the scanner lid 30 is in a closed position, rods 54 extend through both slots 32 and slots 43 to be received in holes 62, thereby engaging the first support frame 60 to the second support frame 50. When scanning a transmissive object placed on the first transparent plate 45, light from the transmissive mode light source 51 passes through the surface of the object and is retrieved by the image-retrieving device 66. Due to their physical engagement, the second support frame 50 is moved synchronously with the first support frame 60 by the driving device 70. Therefore, the alignment of the transmissive mode light source 51 and the image-retrieving device 66 can be synchronously maintained as the object is scanned along the longitudinal axis.

Figure 5C:
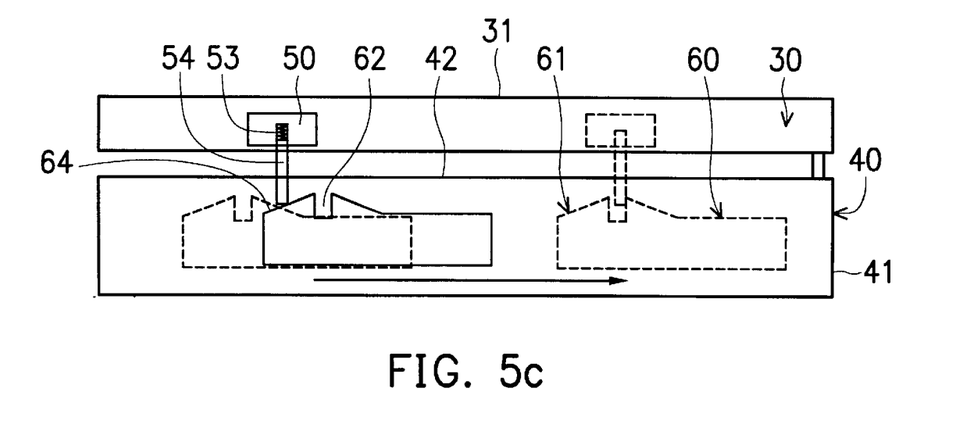

To facilitate the engagement of the second support frame 50 to the first support frame 60, protruding portions 61 on the first support frame 60 can be provided. The protruding portions 61 encompass the holes 62. Referring to FIG. 5c, each protruding portion 61 has an inclined surface 64. If the scanner lid 30 is closed when holes 52 and holes 62 are not aligned, first support frame 60 can be driven to move along the longitudinal axis until the rods 54 are received by the holes 62. As can be seen in the figure, when the lower end of rod 54 contacts the inclined surface 64, the spring 53 is compressed, allowing the rod 54 to slide up the inclined surface 64. When the rod 54 reaches the hole 62, the resilient tension of the spring 53 forces the rod 54 slides down into the hole 62, whereupon the first support frame 60 and the second support frame 50 are engaged.

Figure 4A:
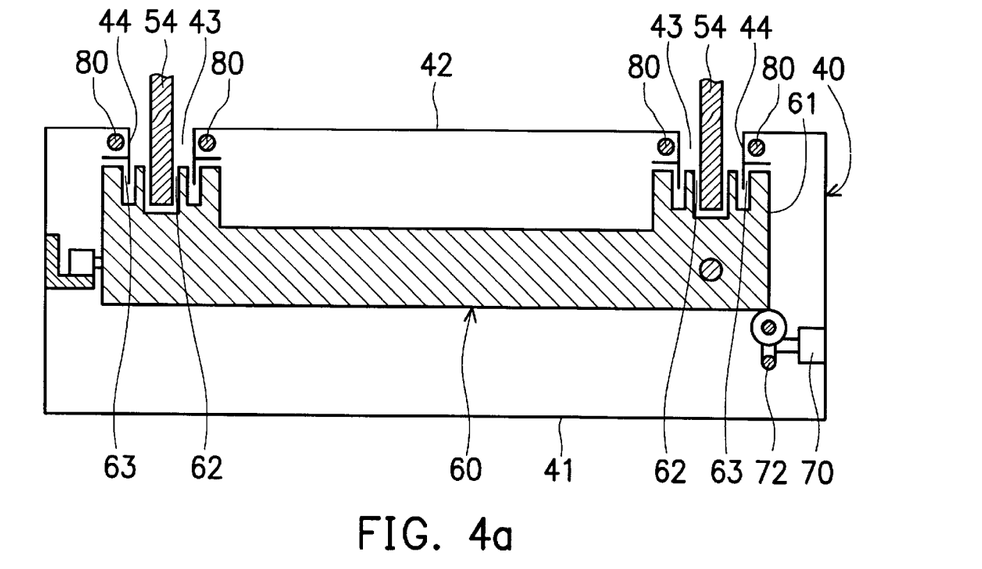
FIGS. 4a–4d are cross sectional views of the lower housing of the scanner according to one embodiment of the present invention along the lines a, b, c, and d in FIG. 3b, respectively.
Figure 4B:
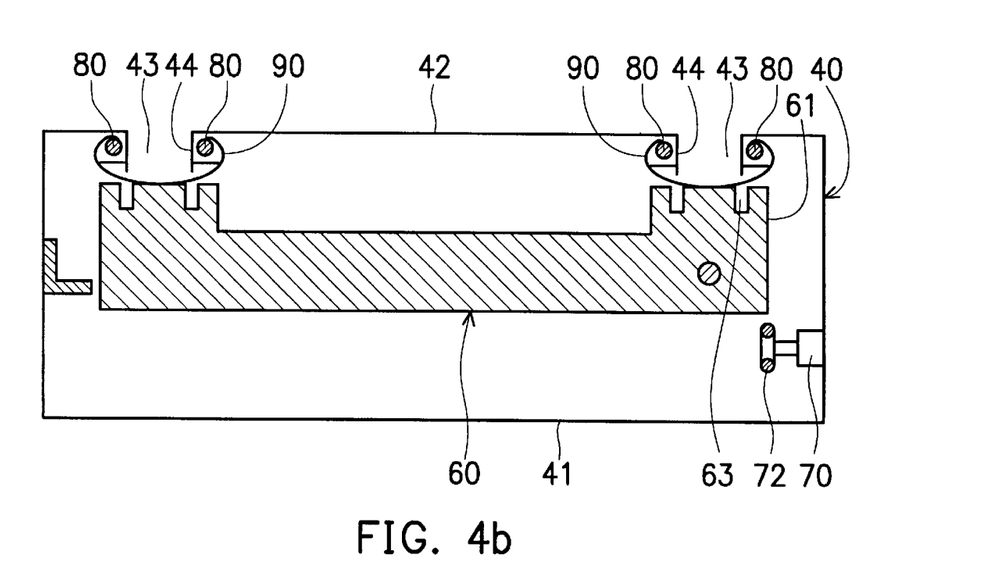
Figure 4C:
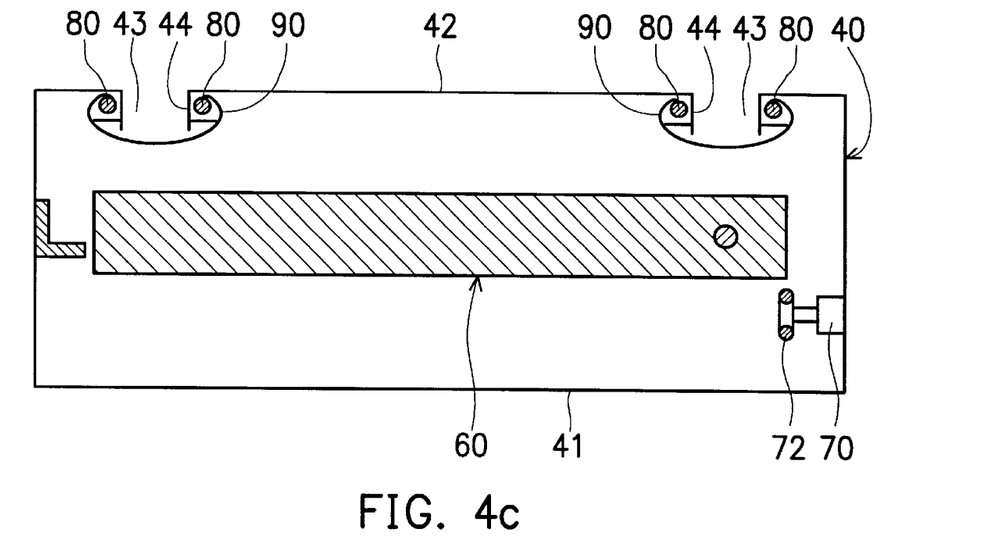
Figure 4D:
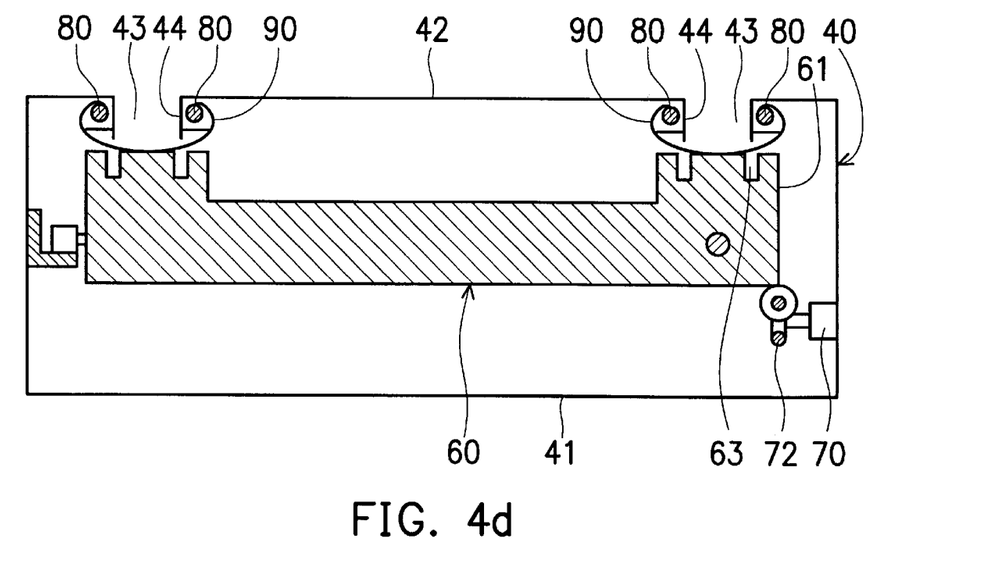
Figure 6A:
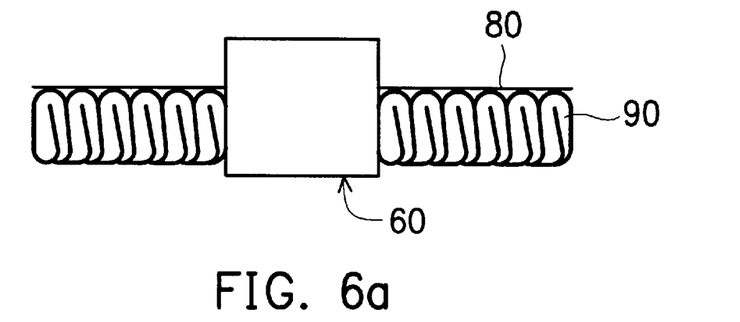
FIGS. 6a–6c are side views of the folding isolation strips of the scanner according to one embodiment of the present invention.
Figure 6B:
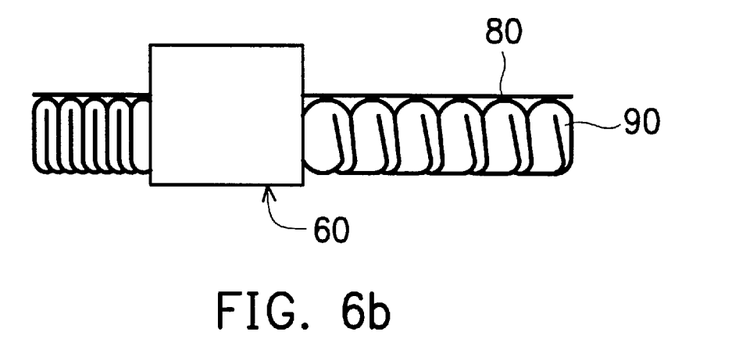
Figure 6C:
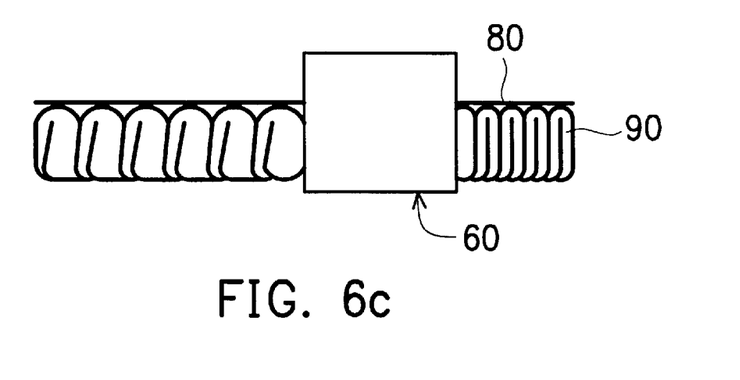

The scanner of the present invention can also include isolation strips 90, as illustrated in FIG. 3b, to prevent dust from entering into the scanner body 40 through grooves 43. In this embodiment, partition walls 44 are formed extending downward at either side of slots 43, as can be seen in FIG. 4a. Grooves 63 are formed in the protruding portions 61 on the first support frame 60 to receive the partition walls 44. Guiding shafts 80 are disposed at opposite sides of partition walls 44, and the isolation strips 90 are disposed between the guiding shafts 80. Referring back to FIG. 3b, each slot 43 is isolated from the inside of the scanner body 40 by the isolation strips 90. The isolation strips 90 are attached to the proximal and distal ends of the protruding portions 61, and the isolation strips 90 extend to at least the proximal and distal ends of slot 43. Cross sectional views 4b and 4d illustrate the isolation strips 90 at the proximal and distal ends of the protruding portions 61, while FIG. 4c shows a cross sectional view of the isolation strips 90 over the non-protruding portion of the first support frame 60. Referring to FIGS. 6a–6c, it can be seen that the isolation strips 90 can fold up or fan out according to the movement of the first support frame 60. By such an arrangement, the slots 43 are isolated from the inside of the scanner body 40 and thus dust can be prevented from passing through the slot 43 and falling into the inside of the scanner body 40.

In this embodiment, rods 54 provide a physical engagement between first support frame 60 and second support frame 50 through slots 43 and slots 32 when scanner lid 30 is in a closed position, thus allowing the alignment of transmissive mode light source 51 and image-retrieving device 66 to be maintained. However, it is understood that other means of physical engagement may be applied to physically engage the two support frames through the slots.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An optical scanner for retrieving images of a scanned object, comprising:

a lower housing defining a longitudinal axis and having an upper surface with a first slot formed there through;

a first transparent plate disposed in the upper surface of the lower housing on which the scanned object is placed;

an upper housing movably disposed on the lower housing so that the upper housing can be moved between an open and a closed position, said upper housing has a lower surface with a second slot formed there through, wherein the first slot and the second slot correspond in position when the upper housing is in the closed position;

a second transparent plate disposed in the lower surface of the upper housing;

a first support frame disposed within the lower housing to be movable along the longitudinal axis;

a first light source disposed on the first support frame for providing light to scan the scanned object;

an image-retrieving device disposed on the first support frame for receiving light from the scanned object;

a second support frame disposed within the upper housing to be movable along the longitudinal axis;

a second light source disposed on the second support frame for providing light to scan the scanned object;

means for engaging the second support frame to the first support frame through the second and first slots when the upper housing is in the closed position; and a driving device for moving the first support frame.

2. The optical scanner as claimed in claim 1, wherein the engaging means comprises a rod disposed on the second support frame and extending downward through the second slot, wherein the rod further extends through the first slot when the upper housing is the closed position so as to engage the second support frame to the first support frame.

3. The optical scanner as claimed in claim 2, wherein the engaging means further comprises a spring disposed between the rod and the second support frame for exerting a resilient tension on the rod.

4. The optical scanner as claimed in claim 3, wherein the first support frame comprises a protruding portion encompassing a hole and having an inclined surface, the hole receiving the rod when the upper housing is in a closed position to engage the second support frame to the first support frame, wherein the spring is compressed when the rod is in contact with the inclined surface of the protruding portion and extended when received by the hole.

5. The optical scanner as claimed in claim 1, wherein a pair of partition walls are extending downward from the upper surface of the lower housing at either side of the first slot, and a pair of grooves are formed in the first support frame for receiving the partition walls.

6. The optical scanner as claimed in claim 5, further comprising:

a pair of guiding shafts disposed in the lower housing at opposite sides of the pair of partition walls;

a first folding isolation strip disposed between the guiding shafts and fixed to a proximal end of the first support frame and extending to at least a proximal end of first slot; and a second folding isolation strip disposed between the guiding shafts and fixed to a distal end of the first support frame and extending to at least a distal end of first slot, wherein the first and second folding isolation strips can be folded up and fanned out by the movement of the first support frame along the longitudinal axis.

7. An optical scanner for reading images on a scanned object, comprising:

a lower housing defining a longitudinal axis and having an upper surface with a first slot formed there through;

a first transparent plate disposed in the upper surface of the lower housing on which the scanned object is placed;

an upper housing movably disposed on the lower housing so that the upper housing can be moved between an open and a closed position, said upper housing has a lower surface with a second slot formed there through, wherein the first slot and the second slot correspond in position when the upper housing is in the closed position;

a first support frame disposed within the lower housing to be movable along the longitudinal axis;

an image-retrieving device disposed on the first support frame for receiving light from the scanned object;

a second support frame disposed within the upper housing to be movable along the longitudinal axis;

a transmissive mode light source disposed on the second support frame for providing light to scan the scanned object;

an engaging device for engaging the second support frame to the first support frame through the second and first slots when the upper housing is in the closed position; and a driving device for moving the first support frame along the longitudinal axis.

8. The optical scanner as claimed in claim 7, wherein the engaging device comprises a rod disposed on the second support frame and extending downward through the second slot, wherein the rod further extends through the first slot when the upper housing is the closed position so as to engage the second support frame to the first support frame.

9. The optical scanner as claimed in claim 8, wherein the engaging device further comprises a spring disposed between the rod and the second support frame for exerting a resilient tension on the rod.

10. The optical scanner as claimed in claim 9, wherein the first support frame comprises a protruding portion encompassing a hole and having an inclined surface, the hole receiving the rod when the upper housing is in a closed position to engage the second support frame to the first support frame, wherein the spring is compressed when the rod is in contact with the inclined surface of the protruding portion and extended when received by the hole.

11. The optical scanner as claimed in claim 7, wherein a pair of partition walls are extending downward from the upper surface of the lower housing at either side of the first slot, and a pair of grooves are formed in the first support frame for receiving the partition walls.

12. The optical scanner as claimed in claim 11, further comprising:

a pair of guiding shafts disposed in the lower housing at opposite sides of the pair of partition walls;

a first folding isolation strip disposed between the guiding shafts and fixed to a proximal end of the first support frame and extending to at least a proximal end of first slot; and a second folding isolation strip disposed between the guiding shafts and fixed to a distal end of the first support frame and extending to at least a distal end of first slot, wherein the first and second folding isolation strips can be fold up and fanned out by the movement of the first support frame along the longitudinal axis.

13. An optical scanner for reading images on a scanned object, comprising:

a lower housing defining a longitudinal axis and having an upper surface with a first engaging means;

a first transparent plate disposed in the upper surface of the lower housing on which the scanned object is placed;

an upper housing movably disposed on the lower housing so that the upper housing can be moved between an open and a closed position, said upper housing has a lower surface with a second engaging means, wherein the first engaging means and the second engaging means correspond in position when the upper housing is in the closed position;

a first support frame disposed within the lower housing to be movable along the longitudinal axis;

an image-retrieving device disposed on the first support frame for receiving light from the scanned object;

a second support frame disposed within the upper housing to be movable along the longitudinal axis;

a light source disposed on the second support frame for providing light to scan the scanned object;

a driving device for moving the first support frame along the longitudinal axis, wherein the first engaging means engages with the second engaging means so that the first support frame and the second support frame can move synchronously along the longitudinal axis when the upper housing is in the closed position.

* * * * *